US012570303B2

(12) United States Patent (10) Patent No.: US 12,570,303 B2

Kanesaka (45) Date of Patent: Mar. 10, 2026

(54) CONTROL DEVICE AND CONTROL METHOD FOR VEHICLE, AND STORAGE MEDIUM

(71) Applicant: HONDA MOTOR CO., LTD., Tokyo (JP)

(72) Inventor: Masashi Kanesaka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 277 days.

(21) Appl. No.: 18/432,773

(22) Filed: Feb. 5, 2024

(65) Prior Publication Data

US 2024/0326853 A1 Oct. 3, 2024

(30) Foreign Application Priority Data

Mar. 31, 2023 (JP) ................................. 2023-059051

(51) Int. Cl.
*B60W 50/14* (2020.01)
*B60W 30/18* (2012.01)

(52) U.S. Cl.
CPC ...... *B60W 50/14* (2013.01); *B60W 30/18163* (2013.01); *B60W 2050/146* (2013.01)

(58) Field of Classification Search
CPC ........... B60W 50/14; B60W 30/18163; B60W 2050/146
See application file for complete search history.

(56) References Cited

U.S. PATENT DOCUMENTS

| | | | |
|---|---|---|---|
| 7,617,030 B2 | 11/2009 | Harumoto et al. | |
| 10,598,504 B2 | 3/2020 | Oh et al. | |
| 10,723,359 B2 | 7/2020 | Thompson et al. | |
| 2008/0133085 A1 | 6/2008 | Harumoto et al. | |
| 2012/0253607 A1* | 10/2012 | Choi ...................... | B60R 25/25 340/5.82 |

(Continued)

FOREIGN PATENT DOCUMENTS

| | | |
|---|---|---|
| JP | H11-348686 A | 12/1999 |
| JP | 2008-233064 A | 10/2008 |

(Continued)

OTHER PUBLICATIONS

Japanese Office Action for Japanese Patent Application No. 2023059051 mailed Nov. 5, 2024 (partially translated).

*Primary Examiner* — Hussein Elchanti
(74) *Attorney, Agent, or Firm* — THOMAS | HORSTEMEYER, LLP

(57) ABSTRACT

A control device for a vehicle executes a particular vehicle control function based at least in part on that a user of the vehicle has authority to use the vehicle control function, acquire a first instruction related to the vehicle control function from the user by using a first operation unit temporarily presented to the user, acquires a second instruction related to the vehicle control function from the user by using a second operation unit permanently presented to the user, displays the first operation unit in appearance indicating that the first instruction cannot be given in a case where the user does not have the authority, and notifies the user of the fact that the second instruction cannot be given in response to operation of the second operation unit in a case where the user does not have the authority.

12 Claims, 7 Drawing Sheets

(56)     References Cited

U.S. PATENT DOCUMENTS

| | | | | |
|---|---|---|---|---|
| 2015/0051780 A1* | 2/2015 | Hahne | B60W 10/20 | |
| | | | 701/23 | |
| 2017/0196032 A1* | 7/2017 | Makke | H04L 67/12 | |
| 2019/0047586 A1 | 2/2019 | Sekine | | |
| 2019/0094038 A1 | 3/2019 | Oh et al. | | |
| 2019/0315369 A1 | 10/2019 | Thompson et al. | | |
| 2021/0149397 A1 | 5/2021 | Shin et al. | | |
| 2022/0291648 A1 | 9/2022 | Sekino et al. | | |
| 2023/0264720 A1* | 8/2023 | Kim | B60W 60/0059 | |
| | | | 701/23 | |
| 2023/0382371 A1* | 11/2023 | Park | B60W 30/18163 | |

FOREIGN PATENT DOCUMENTS

| | | |
|---|---|---|
| JP | 2013-095367 A | 5/2013 |
| JP | 2016-130091 A | 7/2016 |
| JP | 2019-034638 A | 3/2019 |
| JP | 2022-140011 A | 9/2022 |

* cited by examiner

F I G. 2
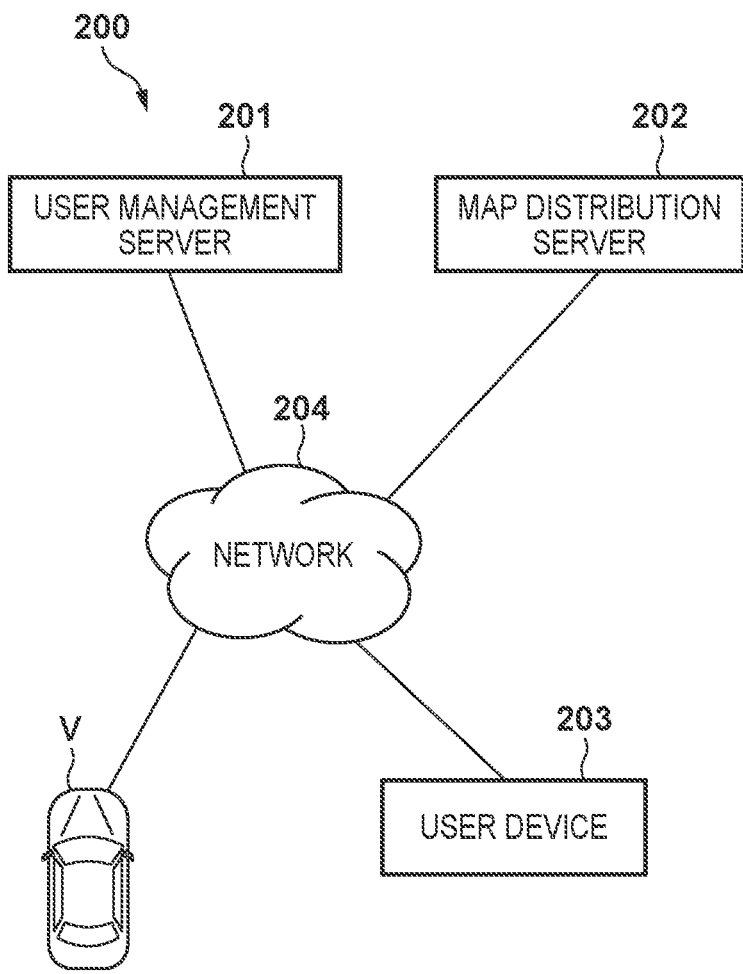

F I G. 3
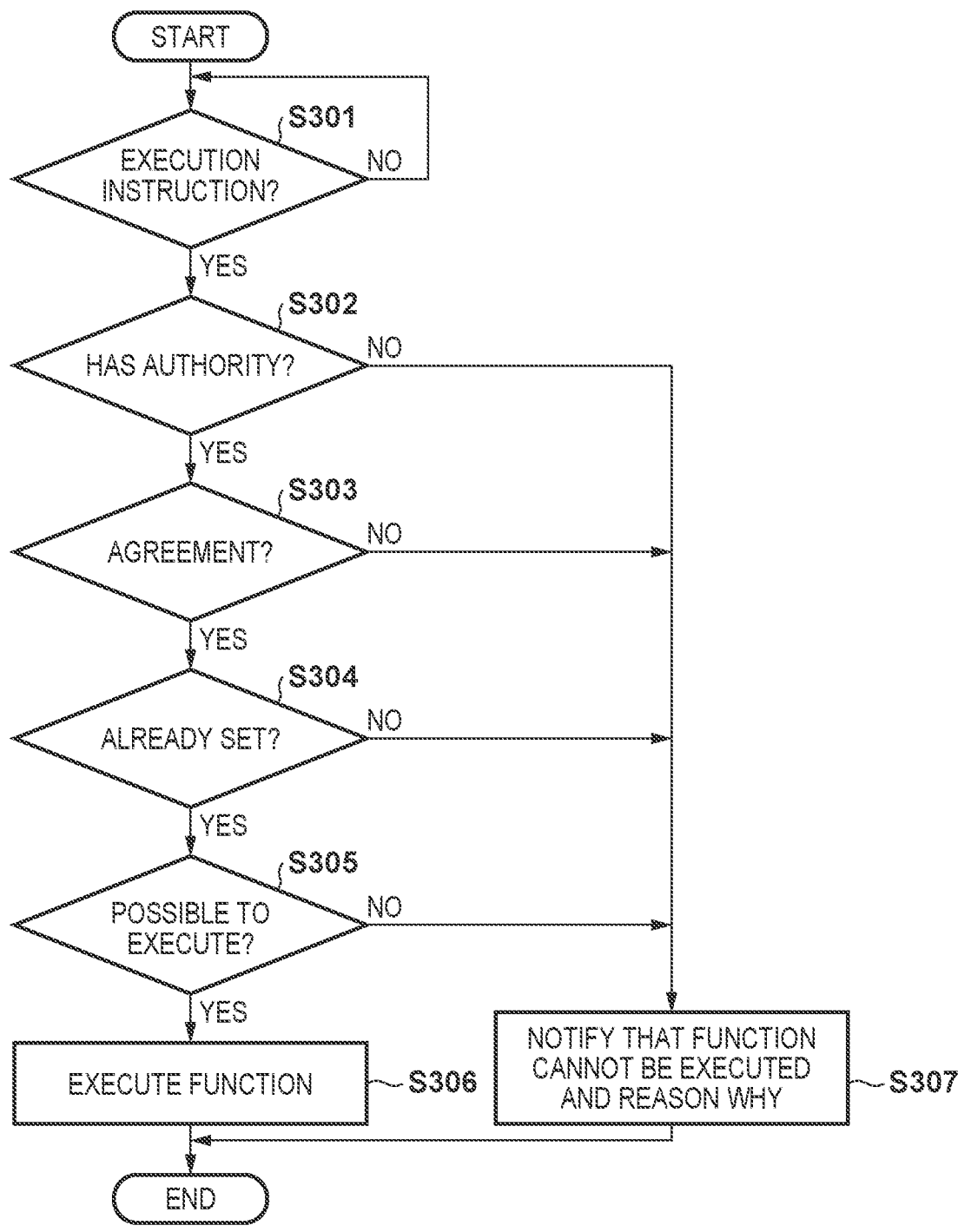

F I G. 4
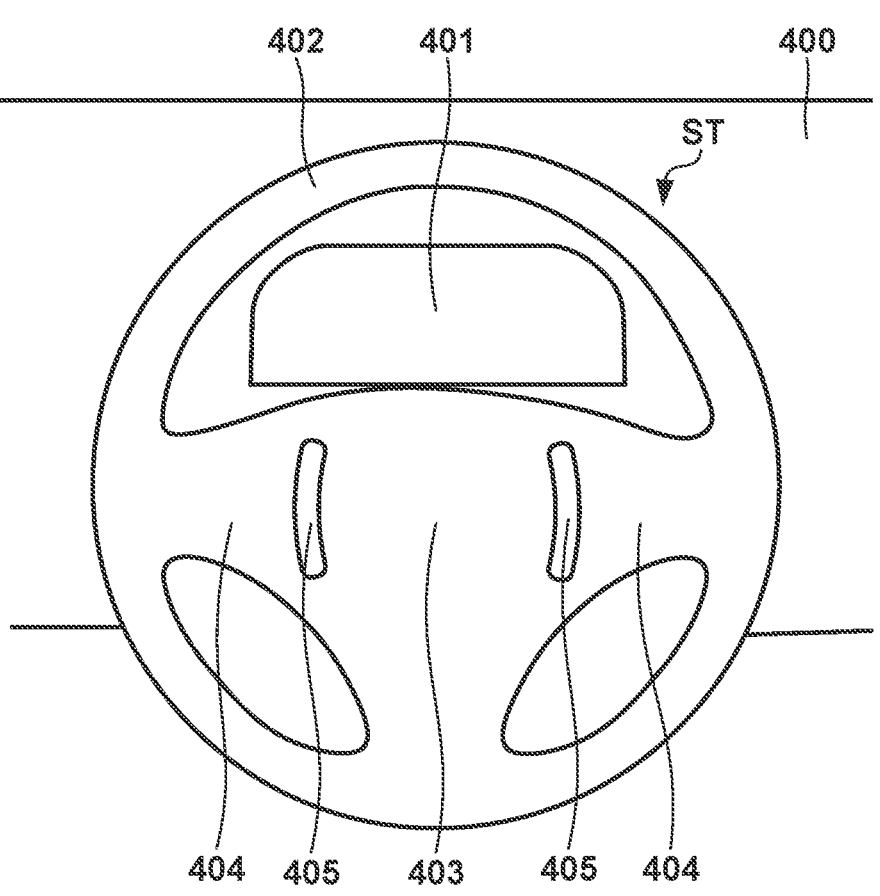

CONTROL DEVICE AND CONTROL METHOD FOR VEHICLE, AND STORAGE MEDIUM

CROSS-REFERENCE TO RELATED APPLICATION(S)

This application claims priority to and the benefit of Japanese Patent Application No. 2023-059051, filed Mar. 31, 2023, the entire disclosure of which is incorporated herein by reference.

BACKGROUND OF THE INVENTION

Field of the Invention

The present invention relates to a control device and a control method for a vehicle, and a storage medium.

Description of the Related Art

There is known a business model that allows a specific function of a vehicle to be executed only in a case where a user has use authority. Japanese Patent Laid-Open No. 2022-140011 describes that a function is enabled to be used in a plurality of vehicles on the basis of license data of a user. Japanese Patent Laid-Open No. 2016-130091 describes that execution of automated driving control of a vehicle is permitted in a case where a driver's license is present in the vehicle. The operation related to the vehicle control function requiring the use authority can be performed by using various types of operation units such as a virtual button and a physical button. A method of presenting information to the user may vary depending on the types of the operation units.

SUMMARY OF THE INVENTION

An aspect of the present invention is to provide a technique for enabling a situation of authority to use a vehicle control function to be easily known. According to some embodiments, a control device for a vehicle, the control device comprising: a vehicle control unit configured to execute a particular vehicle control function based at least in part on that a user of the vehicle has authority to use the vehicle control function; a first acquisition unit configured to acquire a first instruction related to the vehicle control function from the user by using a first operation unit temporarily presented to the user; a second acquisition unit configured to acquire a second instruction related to the vehicle control function from the user by using a second operation unit permanently presented to the user; a display control unit configured to display the first operation unit in appearance indicating that the first instruction cannot be given in a case where the user does not have the authority to use the vehicle control function; and a notification control unit configured to notify the user of the fact that the second instruction cannot be given in response to operation of the second operation unit in a case where the user does not have the authority to use the vehicle control function is provided.

BRIEF DESCRIPTION OF THE DRAWINGS

FIG. 2 is a block diagram illustrating a configuration example of a function providing system according to some embodiments;

FIG. 3 is a flowchart illustrating an operation example of a vehicle according to some embodiments;

FIG. 4 is a schematic diagram illustrating a configuration example around a steering wheel according to some embodiments;

DESCRIPTION OF THE EMBODIMENTS

Figure 1:
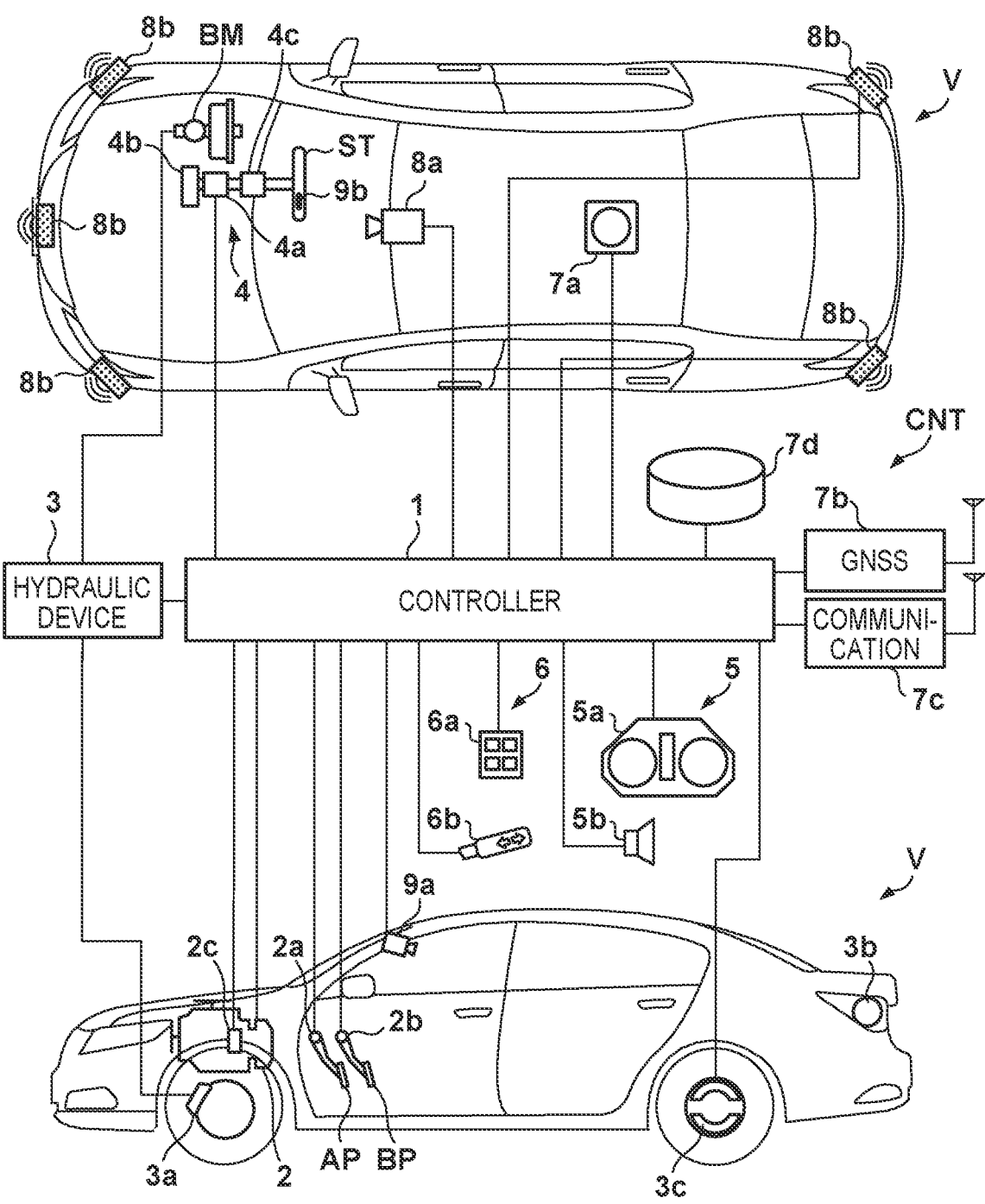
FIG. 1 is a block diagram illustrating a configuration example of a vehicle according to some embodiments.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a block diagram of a control device CNT according to an embodiment of the invention and also a schematic diagram of a vehicle V which is an application example of the control device CNT. In FIG. 1, an outline of the vehicle V is illustrated by a plan view and a side view. The vehicle V in the present embodiment is, as an example, a sedan-type four-wheeled passenger vehicle, and may be, for example, a parallel hybrid vehicle. The vehicle V is not limited to the four-wheeled passenger vehicle, and may be a straddle type vehicle (a motorcycle, an automatic three-wheeled vehicle) or a large vehicle such as a truck or a bus.

The control device CNT includes a controller 1 that is an electronic circuit that executes control of the vehicle V which includes drive assist of the vehicle V. The controller 1 includes a plurality of electronic control units (ECUs). For example, each of the ECUs is provided for each function of the control device CNT. Each ECU includes a processor represented by a central processing unit (CPU), a storage device such as a semiconductor memory, an interface with an external device, and the like. The storage device stores a program to be executed by the processor, data used for processing by the processor, and the like. The interface includes an input and output interface, and a communication interface. Each ECU may include a plurality of processors, a plurality of storage devices, and a plurality of interfaces. A program to be stored in the storage device may be installed in the control device CNT via a storage medium such as a CD-ROM to be stored in the storage device. Additionally or alternatively, the program to be stored in the storage device may be downloaded from an external server via wireless communication.

The controller 1 controls drive (acceleration) of the vehicle V by controlling a power unit (power plant) 2. The power unit 2 is a travelling drive unit that outputs a driving force for rotating driving wheels of the vehicle V, and can include an internal combustion engine, a motor, and an automatic transmission. The motor can be used as a drive source for accelerating the vehicle V, and can also be used as a generator at the time of deceleration or the like (regenerative braking).

In this embodiment, the controller 1 controls outputs of the internal combustion engine and the motor, or switches a gear ratio of the automatic transmission in correspondence with driver's drive operation detected by an operation detection sensor 2a provided in an accelerator pedal AP and an operation detection sensor 2b provided in a brake pedal BP, a vehicle speed of the vehicle V which is detected by a rotation speed sensor 2c, and the like. The automatic transmission is provided with the rotation speed sensor 2c that detects the rotation speed of an output shaft of the automatic transmission as a sensor that detects a traveling state of the vehicle V. It is possible to calculate the vehicle speed of the vehicle V from a detection result of the rotation speed sensor 2c.

The controller 1 controls braking (deceleration) of the vehicle V by controlling a hydraulic device 3. The driver's braking operation on the brake pedal BP is converted into hydraulic pressure in a brake master cylinder BM and is transmitted to the hydraulic device 3. The hydraulic device 3 is an actuator capable of controlling a hydraulic pressure of a hydraulic oil supplied to a brake device 3a (for example, a disc brake device) provided on each of the four wheels based on the hydraulic pressure transmitted from the brake master cylinder BM.

The controller 1 can control braking of the vehicle V by performing drive control of an electromagnetic valve or the like included in the hydraulic device 3. The controller 1 can also configure an electric servo brake system by controlling distribution of a braking force by the brake device 3a and a braking force by the regenerative braking of the motor included in the power unit 2. The controller 1 may turn on a brake lamp 3b at the time of braking.

The controller 1 controls steering of the vehicle V by controlling an electric power steering device 4. The electric power steering device 4 includes a mechanism for steering front wheels in response to a driver's drive operation (steering operation) on a steering wheel ST. The electric power steering device 4 includes a drive unit 4a that exerts a driving force (may be noted as steering assist torque) for assist in the steering operation or automatic steering of the front wheels of the vehicle V). The drive unit 4a includes a motor as a drive source. In addition, the electric power steering device 4 further includes a steering angle sensor 4b that detects a steering angle, and a torque sensor 4c that detects steering torque (also, referred to as steering load torque, and is distinguished from steering assist torque) borne by a driver.

The controller 1 controls electric parking brake devices 3c provided in respective rear wheels of the vehicle V. The electric parking brake device 3c includes a mechanism for locking the rear wheels. The controller 1 is capable of controlling locking and unlocking of the rear wheels by the electric parking brake device 3c.

The controller 1 controls an information output device 5 that notifies the inside of the vehicle of information. The information output device 5 includes, for example, a display device 5a that notifies the driver of information by an image and/or a voice output device 5b that notifies the driver of information by sound. Examples of the display device 5a include a display device provided in an instrument panel, and a display device provided in the steering wheel ST. In this case, the display device 5a may include a head-up display. The information output device 5 may notify an occupant of information by vibration or light.

The controller 1 receives an instruction input from the occupant (for example, the driver) via an input device 6. The input device 6 is disposed at a position operable by the driver, and includes, for example, a switch group 6a that is used when the driver gives an instruction for the vehicle V, and/or a blinker lever 6b for operating a direction indicator (blinker).

The controller 1 recognizes and determines a current position and a course (an attitude) of the vehicle V. In the case of this embodiment, the vehicle V is provided with a gyro sensor 7a, a global navigation satellite system (GNSS) sensor 7b, and a communication device 7c. The gyro sensor 7a detects rotational motion (yaw rate) of the vehicle V. The GNSS sensor 7b detects a current position of the vehicle V. In addition, the communication device 7c performs wireless communication with a server that provides map information and traffic information, and acquires these pieces of information. In a case of this embodiment, the controller 1 determines a course of the vehicle V based on detection results of the gyro sensor 7a and the GNSS sensor 7b, sequentially acquires map information about the course from the server via the communication device 7c, and stores the map information in a database 7d (a storage device). The vehicle V may also include another sensor that detects a state of the vehicle V such as an acceleration sensor that detects acceleration of the vehicle V.

The controller 1 performs drive assist of the vehicle V based on detection results of various detection units provided in the vehicle V. The vehicle V includes a plurality of surroundings detection units 8a and 8b serving as an external sensor that detects the outside (surrounding situation) of the vehicle V, and a plurality of vehicle interior detection units 9a and 9b serving as an in-vehicle sensor that detects a state inside the vehicle (the state of occupants, particularly, the driver). The controller 1 can ascertain the situation surrounding the vehicle V based on the detection results of the surroundings detection units 8a and 8b and then perform drive assist for the vehicle V in correspondence with this surrounding situation. In addition, the controller 1 can determine whether or not the driver is performing a predetermined operation obligation imposed on the driver when performing drive assist based on the detection results of the vehicle interior detection units 9a to 9b.

The surroundings detection unit 8a (hereinafter, may be referred to as a front camera 8a) is an imaging device that captures an image in front of vehicle V, and is attached, for example, to a vehicle interior of a windshield at the front of a roof of the vehicle V. The controller 1 can extract a contour of an object or lane marks (such as a white line) on a road by analyzing an image captured by front camera 8a.

The surroundings detection unit 8b is a millimeter wave radar (hereinafter, may be referred to as a radar 8b), detects an object around the vehicle V by using radio waves, and detects (measures) a distance to the object and a direction (azimuth) of the object with respect to the vehicle V. In the example illustrated in FIG. 1, five radars 8b including one at the center of the front part of the vehicle V, one at each of the right and left corner portions of the front part of the vehicle V, and one at each of the right and left corner portions of the rear part of the vehicle V.

The surroundings detection unit provided in the vehicle V is not limited to the above-described configuration, and the number of cameras and the number of radars may be changed, or a light detection and ranging (LiDAR) for detecting objects around the vehicle V may be provided.

The vehicle interior detection unit 9a is an imaging device that captures an image of the inside of the vehicle (hereinafter, may be referred to as an in-vehicle camera 9a), and is attached to, for example, the vehicle interior at the front part of the roof of the vehicle V. In the case of this embodiment, the in-vehicle camera 9*a* is a driver monitor camera that captures an image of the driver (for example, eyes and a face of the driver). The controller 1 can determine the directions of the line of sight and the face of the driver by analyzing an image (a face image of the driver) captured by the in-vehicle camera 9*a*.

The vehicle interior detection unit 9*b* is a grip sensor (hereinafter, may be referred to as a grip sensor 9*b*) that detects that the driver grips the steering wheel ST, and is provided, for example, in at least a part of the steering wheel ST. As the vehicle interior detection unit, the torque sensor 4*c* that detects the steering torque of the driver may be used.

Examples of the drive assist for the vehicle V with respect to the driver include acceleration/deceleration assist, lane keeping assist, and lane change assist. The acceleration/deceleration assist corresponds to drive assist (adaptive cruise control (ACC)) under which the controller 1 automatically controls acceleration/deceleration of the vehicle V within a predetermined speed range by automatically controlling both the power unit 2 and the hydraulic device 3 based on the map information and detection results of the surroundings detection units 8*a* and 8*b*. When another vehicle (preceding vehicle) is travelling in front of the vehicle V, ACC can also be executed to accelerate/decelerate the vehicle V so that the distance between the vehicle V and the preceding vehicle is kept constant. ACC is effective to reduce the burden on the driver in an acceleration/deceleration operation (operation on the accelerator pedal AP or the brake pedal BP).

The lane keeping assist corresponds to drive assist (lane keeping assist system (LKAS)) in which the controller 1 automatically controls the electric power steering device 4 based on the map information and the detection results of the surroundings detection units 8*a* and 8*b* to keep the vehicle V within the lane. LKAS is effective to reduce the burden on the driver in a steering operation (operation on the steering wheel ST) while the vehicle V is travelling straight.

The lane change assist corresponds to drive assist (auto lane changing (ALC) or active lane change assist (ALCA)) in which the controller 1 automatically changes the lane on which the vehicle V is travelling to an adjacent lane by automatically controlling the power unit 2, the hydraulic device 3, and the electric power steering device 4 based on the map information and the detection results of the surroundings detection units 8*a* and 8*b*. ALC corresponds to the lane change assist based on a system request, whereas ALCA corresponds to the lane change assist based on an occupant request. Examples of a situation where the system request is made include a situation where a navigation system recommends the driver to change lanes during route guidance of the vehicle V to a destination, and another situation where the vehicle V attempts to overtake a preceding vehicle independently of the route guidance. When making an occupant request, the driver gives an instruction for lane change by operating an input device (for example, the blinker lever 6*b*). Both ALC and ACLA are effective to reduce the burden on the driver in the acceleration/deceleration operation or the steering operation on the vehicle V during the lane change.

Other examples of the drive assist control may include, for example, collision reduction braking that assists collision avoidance with an object (for example, a pedestrian, another vehicle, or an obstacle) on a road by controlling the hydraulic device 3, an ABS function, traction control, and/or posture control of the vehicle V.

In some embodiments, the controller 1 selectively executes one of three modes including Mode 1 to Mode 3 having different drive assist content. The mode may be referred to as a state. Hereinafter, a case where ACC, LKAS, ALC, or ACLA is provided as the drive assist will be described, but the drive assist content of each of Mode 1 to Mode 3 is not limited to ACC, LKAS, ALC, or ACLA, and may include other drive assist contents. Furthermore, only one of ALC and ACLA may be possible.

Mode 1 corresponds to a manual drive mode in which none of ACC, LKAS, ALC, and ACLA is executed and is based on driver's manual drive operation. This mode is set first when the vehicle V is activated.

Both Mode 2 and Mode 3 are set under the condition that the occupant makes a request for drive assist when the vehicle V is in Mode 1. Mode 2 is a regular assist mode in which both ACC and LKAS are executable. In Mode 2, neither ALC nor ACLA is executed.

Mode 3 is an extended assist mode in which all of ACC, LKAS, ALC, and ACLA are executable. The extended assist mode may also be referred to as an advanced highway driving (AHD) mode. Mode 3 is a mode on the assumption that the controller 1 acquires high-precision map information including information on a road (traveling road) on which the vehicle V travels. The high-precision map information is map information having more precise information about road information than map information (sometimes referred to as normal map information) used for guiding a route to a destination. Specifically, the high-precision map information may include at least position information in a lane. With the high-precision map information, a location of the vehicle V in a vehicle width direction can be controlled. The high-precision map information may further include information regarding a detailed shape of the road such as presence or absence of a curve and a curvature thereof, an increase or a decrease of a lane, and a gradient. The high-precision map information is prepared, for example, for each region or road section, and there may be a region or a road section in which the high-precision map information is not arranged.

In Mode 3, lane change assist (ALC and ACLA) is performed using the high-precision map information. By utilizing position information in the lane which is included in the high-precision map information and the current position of the vehicle V detected by the GNSS sensor 7*b*, it is possible to perform highly reliable and smooth lane change assist while recognizing other surrounding vehicles from the surroundings detection results of the detection units 8*a* to 8*b*. The lane change assist may be performed without using the high-precision map information.

Both Mode 2 and Mode 3 are modes capable of executing ACC and LKAS, but in Mode 3, ACC and LKAS using high-precision map information can be executed. The controller 1 can perform acceleration/deceleration of the vehicle V and position control in a left and right direction by acquiring the road information of a traveling destination of the vehicle V in advance from the high-precision map information, and can provide the occupant with highly reliable and smooth ACC and LKAS.

The vehicle control function such as the drive assist function according to Mode 2 and Mode 3 may be executable by assigning authority to use the vehicle control function to a user of the vehicle V by a provider of the vehicle control function (for example, a manufacturer of the vehicle V). The user of the vehicle V may be called an occupant of the vehicle V when the user is boarding the vehicle V. In addition, the user of the vehicle V can be called a driver of the vehicle V when the user is driving the vehicle V. In the following description, the user of the vehicle V is simply referred to as a user. The authority to use the vehicle control function may be assigned, for example, when the user makes a contract with the provider of the vehicle control function after the start of use of the vehicle V. A configuration example of a function providing system 200 for providing a vehicle control function that requires authority to use the function will be described with reference to FIG. 2.

The function providing system 200 may include, for example, a vehicle V, a user management server 201, a map distribution server 202, and a user device 203. Although only one vehicle Vis illustrated in the example of FIG. 2, the function providing system 200 may include a plurality of vehicles. Similarly, the function providing system 200 may include a plurality of user devices 203. The vehicle V, the user management server 201, the map distribution server 202, and the user device 203 may communicate with each other via a network 204. The network 204 may include a local area network (LAN), a wide area network (WAN), the Internet, a cellular network, or any combination thereof. Communication between the vehicle V and the network 204 is typically radio communication.

The user management server 201 manages user information. For example, the user management server 201 may assign the authority to use the vehicle control function to the user in response to a request from the user. The request for assigning of use authority may be made by the user by using the user device 203. The user device 203 is a device that is used by a user, and may be, for example, a personal computer, a mobile phone, a smartphone, a tablet computer, or the like. The request for assigning of use authority may be made by the user by using the vehicle V.

The request for assigning of the use authority may include user account information and identification information of a target vehicle (for example, the vehicle V) that enables execution of the vehicle control function. The user account information is information for the user management server 201 to uniquely identify the user. The identification information of the vehicle may be a vehicle identification number (VIN). The request for assigning of the use authority may include designation of a type of a vehicle control function to which the use authority is to be assigned. The vehicle control function to which the use authority is to be assigned may be the entire AHD described above, may be some of the functions (for example, ALC or ALCA), may be another drive assist function, or may be a function other than the drive assist function.

With respect to a vehicle (for example, the vehicle V) designated by the user, the user management server 201 assigns the authority to use the vehicle control function designated by the user to the user in response to a request from the user. The use authority may be assigned for a fee or may be assigned for free. The user management server 201 may set an expiration date in the use authority. When the expiration date has passed, the use authority will be canceled. The user may be able to extend the expiration date by updating the use authority before the expiration date. For each user to be managed, the user management server 201 may store user account information, vehicle identification information, a vehicle control function for which the user has the use authority, and an expiration date of the use authority (if set) in association with each other.

The vehicle V (specifically, the controller 1, the same shall apply hereinafter) may query the server whether the user has authority to use a specific vehicle control function. The inquiry may include account information of the user and identification information of the vehicle V. In response to receiving the inquiry including the account information of the user and the identification information of the vehicle V, the user management server 201 refers to the user information managed by the user management server and determines whether the user has the use authority associated with these pieces of information. When the user has the use authority, the user management server 201 transmits information indicating the vehicle control function for which the user has the use authority to the vehicle V. When an expiration date is set for the use authority, the user management server 201 also transmits the expiration date to the vehicle V. When the user does not have the use authority, the user management server 201 may transmit information indicating the vehicle control function for which the user does not have the use authority to the vehicle V. In this manner, the vehicle V acquires the information indicating whether the user has the authority to use the specific vehicle control function and the expiration date (if set) from the user management server 201. The vehicle V may store these pieces of information and use them for subsequent processing.

The vehicle V may transmit information indicating the state of the vehicle V to the user management server 201. The information indicating the state of the vehicle V may include, for example, information on a failure occurring in the vehicle V. The user management server 201 may notify the user device 203 of information indicating the state of the vehicle V. For example, in a case where information indicating that a failure has occurred in the vehicle Vis received from the vehicle V, the user management server 201 may notify the user device 203 of the information.

The map distribution server 202 is an example of a server that provides information that is used for the vehicle V to execute a specific vehicle control function. The map distribution server 202 may provide map information (for example, the high-precision map information as described above) as such information. The map distribution server 202 may provide the map information to the vehicle V at least on the basis of the fact that the user has the authority to use the map information.

For example, in order to acquire the map information from the map distribution server 202, the vehicle V may transmit information indicating that the user has the authority to use the map information to the map distribution server 202. This information may be a token provided by the user management server 201. When it is determined that the user has the authority to use the map information, the map distribution server 202 may transmit the map information to the vehicle V.

An example of a method of initiating execution of a specific vehicle control function by the controller 1 of the vehicle V will be described with reference to FIG. 3. Each step of the method of FIG. 3 may be performed by executing a program stored in a memory of the controller 1 by a processor of the controller 1. Alternatively, some or all of the steps of the method of FIG. 3 may be performed by a dedicated integrated circuit such as an application specific integrated circuit (ASIC).

The method of FIG. 3 may be initiated in response to turning-on of the power source (for example, an ignition power supply) of the vehicle V. Furthermore, the method of FIG. 3 may be initiated in response to user's log-in to the vehicle V by account information of the user. For example, the user may input his/her account information to the input device 6. The controller 1 may determine whether the account information input by the user matches the account information registered in the vehicle V. When the pieces of account information match each other, the controller 1 may use the matching account information to perform subsequent processing. According to this, it possible to suppress execution of the vehicle control function when a person other than the user having the use authority uses the vehicle V.

In step S301, the controller 1 determines whether an instruction for execution of a specific vehicle control function has been received from the user. In a case where it is determined that the instruction for execution of the specific vehicle control function has been received from the user ("YES" in S301), the controller 1 shifts the process to S302, and repeats S301 in the other cases ("NO" in S301). In this manner, the controller 1 waits for an instruction for execution of the specific vehicle control function. The specific vehicle control function may be, for example, a drive assist function of the vehicle V, and may be, for example, ACC, LKAS, ALC, ACLA, or a combination thereof as described above.

In S302, the controller 1 determines whether or not the user has authority to use the instructed vehicle control function. In a case where it is determined that the user has authority to use the instructed vehicle control function ("YES" in S302), the controller 1 shifts the process to S303, and otherwise ("NO" in S302), the controller 1 shifts the process to S307. In a case where it is determined that the user does not have the authority to use the instructed vehicle control function, the controller 1 notifies the user of the fact that the instructed vehicle control function cannot be executed in S307. Further, the controller 1 may notify the user of the fact that the user is not authorized. In this case, the controller 1 may guide the user to a method of acquiring the authorization (for example, a method of applying for a use contract).

The controller 1 may acquire information indicating whether the user has authority to use a specific vehicle control function from the user management server 201 before S301 is executed, and store the information in the memory of the controller 1. For example, the controller 1 may transmit an inquiry as to whether the user has authority to use a specific vehicle control function to the user management server 201 in response to turning-on of an ignition power supply of the vehicle V. The controller 1 may determine that the user does not have the use authority when the expiration date of the use authority has passed. A program for realizing the specific vehicle control function may be stored in the vehicle V in advance (for example, at the time of manufacturing the vehicle V), or may be downloaded to the vehicle V after the authority to use the function is assigned to the user.

In S303, the controller 1 determines whether the user agrees that the controller 1 uses personal information. In a case where it is determined that the user agrees to use the personal information ("YES" in S303), the controller 1 shifts the process to S304, and otherwise ("NO" in S303), the controller 1 shifts the process to S307. In a case where it has not been confirmed that the user agrees with the use of the personal information, the controller 1 notifies the user of the fact that the instructed vehicle control function cannot be executed in S307. Further, the controller 1 may notify the user of the fact that it has not been confirmed that the user agrees to use the personal information. In this case, the controller 1 may guide the user how to agree to use the personal information (for example, a screen for agreeing on the use of personal information may be presented to the user).

Agreement on the use of personal information may be made to the vehicle V, and the controller 1 may store the agreement in the memory to be used for subsequent processing. Alternatively or additionally, the agreement regarding the use of the personal information may be made to the user management server 201 through the user device 203. The controller 1 may acquire information indicating that the user agrees to use the personal information from the user management server 201 and store the information in the memory for subsequent processing.

Depending on the content of the vehicle control function, personal information of the user is used. For example, in a case where the high-precision map information as described above is used, the current position of the vehicle V is provided to the map distribution server 202. Since the current position of the vehicle V matches the current position of the user, the current position may correspond to personal information. In addition, an image of the user captured by the in-vehicle camera 9a may also correspond to the personal information. In order to use such personal information, the user's agreement may be required by law in some countries. In a case where the instructed vehicle control function does not use personal information, S303 may be omitted. In a case where the vehicle V is used in a country that does not have a law requiring agreement of the user to use personal information, S303 may be omitted.

In S304, the controller 1 determines whether enabling execution of the instructed vehicle control function is set in advance by the user. In a case where it is determined that enabling execution of the instructed vehicle control function is set in advance by the user ("YES" in S304), the controller 1 shifts the process to S305, and otherwise ("NO" in S304), the controller 1 shifts the process to S307. In a case where it is determined that enabling execution of the instructed vehicle control function is not set in advance by the user, the controller 1 notifies the user of the fact that the instructed vehicle control function cannot be executed in S307. Further, the controller 1 may notify the user of the fact that enabling execution of the instructed vehicle control function is not set. In this case, the controller 1 may guide the user on a method of setting enabling execution of the indicated vehicle control function (for example, a screen for setting enabling execution of the instructed vehicle control function may be presented to the user).

Information indicating whether enabling execution of the indicated vehicle control function is set may be stored in the memory of the controller 1, and the processor of the controller 1 may refer to this information. In S301, the user may unintentionally give an instruction for execution of a specific vehicle control function (for example, an instruction button may be erroneously touched). Therefore, the controller 1 may set that enabling execution of the specific vehicle control function is set in advance by the user as a precondition for executing the specific vehicle control function. In a case where such a precondition is unnecessary, S304 may be omitted.

In S305, the controller 1 determines whether the instructed vehicle control function is in an executable state. In a case where it is determined that the instructed vehicle control function is in the executable state ("YES" in S305), the controller 1 shifts the process to S306, and otherwise ("NO" in S305), the controller 1 shifts the process to S307. In a case where it is determined that the instructed vehicle control function is not in the executable state, the controller 1 notifies the user of the fact that the instructed vehicle control function cannot be executed in S307. Further, the controller 1 may notify the user of the fact that the instructed vehicle control function is not in the executable state.

For example, in a case where the instructed vehicle control function requires high-precision map information and the high-precision map information is not in a usable state, the controller 1 may determine that the function is not in the executable state. In a case where the instructed vehicle control function is executable only in a specific travelling environment (for example, a highway) and the vehicle V is not in such a travelling environment, the controller 1 may determine that the function is not in the executable state. In a case where the indicated vehicle control function requires an initial check of a sensor (for example, radar) and such an initial check is not completed, the controller 1 may determine that the function is not in the executable state.

In S306, the controller 1 executes the instructed vehicle control function. Thereafter, the controller 1 controls the vehicle V in accordance with the vehicle control function. In a case where the vehicle control function is terminated in response to an instruction of the user or in response to a change in the travelling environment, the controller 1 may execute the method of FIG. 3 again and wait for an instruction for execution of the specific vehicle control function. The instructed vehicle control function may use map information provided by the map distribution server 202. The controller 1 may receive the map information from the map distribution server 202 while executing the vehicle control function.

A configuration example of the steering wheel ST will be described with reference to FIG. 4. The steering wheel ST is attached to an instrument panel 400 disposed at front of the vehicle interior of the vehicle V. The instrument panel 400 includes a meter display section 401. The controller 1 displays various instruments, messages, icons, and the like for notifying the driver of information and a state of the vehicle V on the meter display section 401. In the example of FIG. 4, the meter display section 401 is located behind the steering wheel ST when viewed from the driver.

The steering wheel ST includes a rim 402, a hub 403, and a spoke 404. The rim 402 has, for example, a circular shape. The hub 403 is located on an inner side of the rim 402. The hub 403 is connected to a shaft extending from the instrument panel 400. The hub 403 may store an airbag. The spoke 404 connects the rim 402 and the hub 403 to each other. In the example of FIG. 4, the steering wheel ST includes three pieces of the spokes 404. The three spokes 404 are located on a right side of the hub 403, on a left side of the hub 403, and on a lower side of the hub 403 when viewed from the driver. The steering wheel ST may have a structure other than the structure illustrated in FIG. 4.

The steering wheel ST is provided with an indicator 405. The indicator 405 is disposed at a position visible from the driver. In the example of FIG. 4, the indicator 405 is included in the spokes 404. Alternatively, the indicator 405 may be included in another portion of the steering wheel ST, for example, in the rim 402 or the hub 403. In the example of FIG. 4, the indicator 405 is constituted by two separate portions, one of the parts is located in the right spoke 404 and the other is located in the left spoke 404. Alternatively, the indicator 405 may be constituted by only one portion or may be constituted by three or more portions. The indicator 405 is an example of a notification unit that performs notification to the driver. Instead of the indicator 405, another notification unit, for example, a dot-matrix type display may be used.

The controller 1 may control notification by using the indicator 405. For example, the controller 1 may operate the indicator 405 in a state selected from a light-off state, a light-on state, and a blinking state. The controller 1 may notify the user of the fact that a specific vehicle control function is executable by using the indicator 405. For example, the controller 1 may turn off the indicator 405 in a case where the drive assist function (for example, ALC) using the high-precision map information is not executable, and may turn on the indicator 405 in a case where the drive assist function (for example, ALC) using the high-precision map information is executable.

In the above-described example, the vehicle V includes the steering wheel ST, and the indicator 405 is included in the steering wheel ST. The steering wheel ST is an example of an operation input unit of the vehicle V, and other operation input units may be used. For example, a joystick may be mounted on the vehicle V as an operation input unit. In this case, the indicator 405 may be included in the joystick.

A physical button 406 is provided on the steering wheel ST (In the example of FIG. 4, the right spoke 404). The physical button 406 is an example of a button that physically exists. In the example of FIG. 4, the physical button 406 is provided on the steering wheel ST, but the physical button 406 may be provided on another component of the vehicle V. The physical button 406 may be, for example, an electrostatic capacitance-type button, a stroke button, or a button having another structure. The physical button 406 is an example of an operation unit permanently presented to the user. Description of "permanently presented" may represent presentation to the user even in a state where the power supply of the vehicle V is turned off. The appearance of the physical button 406 may be unchanged.

The controller 1 may acquire an instruction related to a specific vehicle control function from the user by using the physical button 406. For example, the instruction may be an instruction for performance of the specific vehicle control function. As described above, the specific vehicle control function may be a drive assist function, a drive assist function using high-precision map information, or ALC or ALCA. The type of the vehicle control function instructed to be executed by the physical button 406 may be uniquely associated with the physical button 406. In a case where the controller 1 has a plurality of vehicle control functions, the steering wheel ST may include a physical button for each vehicle control function.

In S301 of FIG. 3, the controller 1 may determine that the instruction for execution of the specific vehicle control function is acquired from the user in response to the operation of the physical button 406. The controller 1 executes the vehicle control function in S306 based at least in part on that the physical button 406 is operated in a state where the vehicle control function instructed by the user is executable. In this manner, the user can give an instruction for execution of the specific vehicle control function only by operating the physical button 406 without performing a stepwise operation.

In a case where the user does not have the authority to use the vehicle control function associated with the physical button 406, the controller 1 notifies the user of the fact that the instruction for execution of the vehicle control function cannot be given in S307 in response to the operation of the physical button 406. According to this, the user can easily recognize that the vehicle control function cannot be executed. In addition, in a case where the user has the use authority and the user does not agree with use of the personal information by the controller 1, the controller 1 may notify the user of the fact that agreement regarding the use of the personal information is necessary for execution of the vehicle control function in S307 in response to the operation of the physical button 406. According to this, the user can easily recognize that agreement regarding use of personal information is necessary for execution of the vehicle control function.

Figure 5:
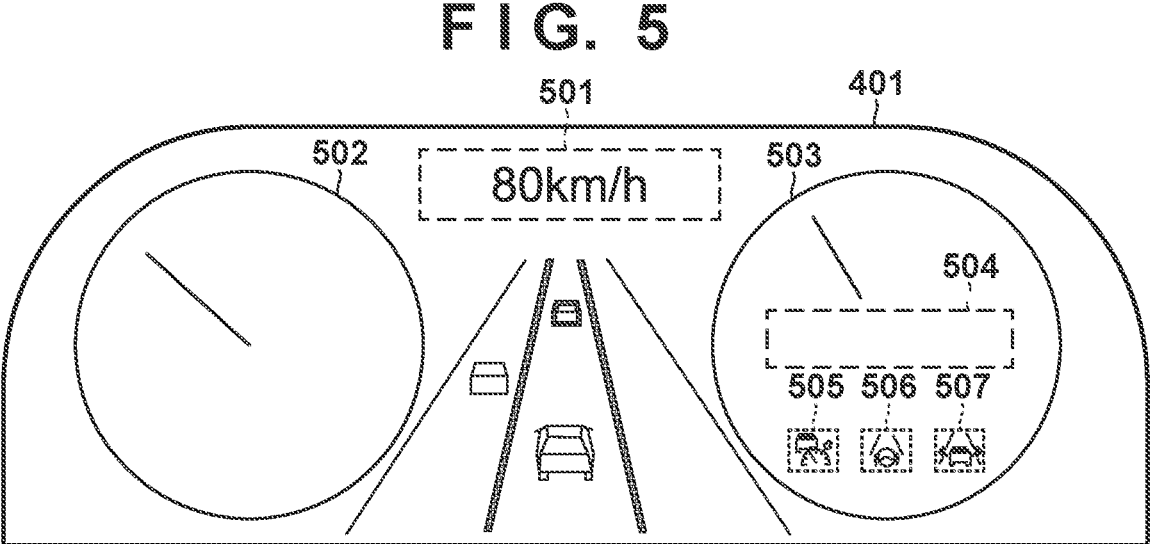
FIG. 5 is a schematic diagram illustrating a configuration example of a meter display section according to some embodiments.

A display example of the meter display section 401 will be described with reference to FIG. 5. The controller 1 may control notification by using the meter display section 401. The controller 1 may display a vehicle speed of the vehicle V in a speed region 501 of the meter display section 401. The controller 1 may display tachometer 502 and speedometer 503 on the meter display section 401. The controller 1 may display a message directed to the driver in a message area 504. The controller 1 may display other contents not illustrated in FIG. 5.

The meter display section 401 may include an icon 505 associated with ACC in Mode 2, an icon 506 associated with KLAS in Mode 2, and an icon 507 associated with ALC or ALCA in Mode 3.

The controller 1 may display the icon 505 in a specific color (for example, white) to indicate that ACC is executable, may display the icon 505 in another color (for example, green) to indicate that ACC is being executed, or may not display the icon 505 to indicate that ACC is not executable. The controller 1 may display the icon 506 in a specific color (for example, white) to indicate that LKAS is executable, may display the icon 506 in another color (for example, green) to indicate that LKAS is being executed, or may not display the icon 506 to indicate that LKAS is not executable. The controller 1 may display the icon 507 in a specific color (for example, white) to indicate that ALC or ALCA is executable, may display the icon 507 in another color (for example, green) to indicate that ALC or ALCA is being executed, or may not display the icon 507 to indicate that ALC or ALCA is not executable.

In this manner, any of the icons 505 to 507 may be information indicating that a specific vehicle control function can be executed. In particular, the icon 507 may be information indicating that the vehicle control function (for example, ALC or ALCA) can be executed by using the map information received from the map distribution server 202.

Figure 6:
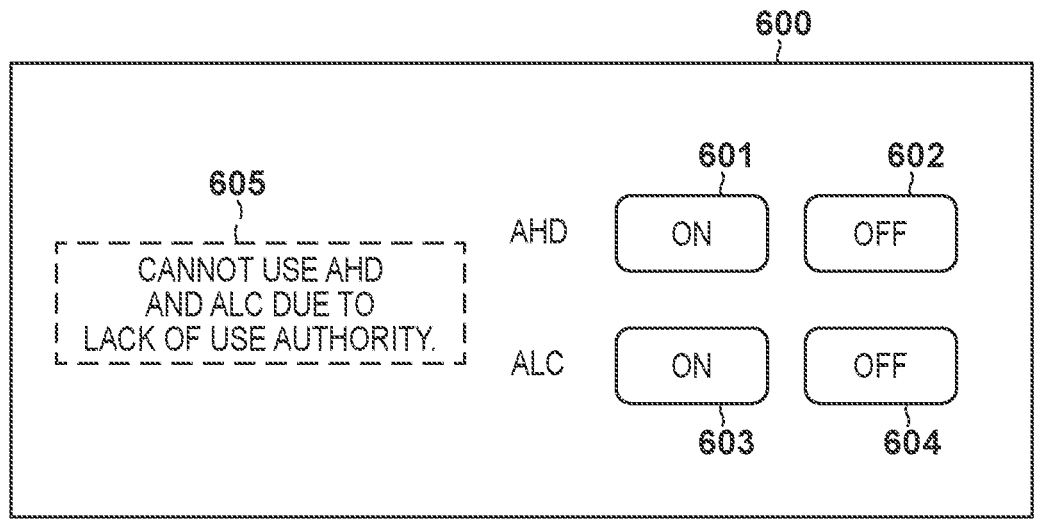
FIG. 6 is a schematic diagram illustrating an example of a configuration of a setting screen according to some embodiments.

An example of a screen 600 for setting of enabling a specific vehicle control function will be described with reference to FIG. 6. The screen 600 is displayed on the display device 5a. The display device 5a may be configured by, for example, a touch screen. The screen 600 may include virtual buttons 601 to 604. The virtual buttons 601 to 604 are examples of an operation unit temporarily presented to the user. Description of "temporarily presenting" may represent non-presentation to the user in certain cases (for example, in a case where the power of the vehicle V is turned off, or in a case where a screen other than the screen 600 is displayed on the display device 5a). The controller 1 may change the appearance of the virtual buttons 601 to 604.

The virtual buttons 601 and 602 may be operation units for acquiring an instruction related to AHD from the user. In response to pressing of the virtual button 601 by the user, the controller 1 determines that enabling execution of all vehicle control functions used in the AHD has been set by the user, and stores information indicating this in the memory. To indicate that the setting is reflected, the controller 1 may turn on the virtual button 601 and turn off the virtual button 602. In response to pressing of the virtual button 602 by the user, the controller 1 determines that enabling execution of all vehicle control functions used in the AHD has been set by the user, and stores information indicating the determination in the memory. To indicate that the setting is reflected, the controller 1 may turn off the virtual button 601 and turn on the virtual button 602.

In a case where the user does not have authority to use the AHD, the controller 1 may display the virtual buttons 601 and 602 in appearance indicating that the AHD cannot be set. For example, the controller 1 may gray out both the virtual buttons 601 and 602 in a case where the user does not have authority to use AHD. As a result, the user can recognize that the user does not have the authority to use the AHD by appearance without operating the virtual buttons 601 and 602.

The virtual buttons 603 and 604 may be operation units for acquiring an instruction related to ALC from the user. Since the operations of the virtual buttons 603 and 604 may be similar to those of the virtual buttons 601 and 602, redundant description will be omitted.

The screen 600 may include a field 605 for indicating a status of authority to use a specific vehicle control function. In a case where the user does not have the authority to use the specific vehicle control function, the controller 1 may display a message indicating the fact in the field 605. In a case where the user has the authority to use the specific vehicle control function, the controller 1 may display a message indicating the fact in the field 605. In addition, in a case where an expiration date is set for the authority to use the specific vehicle control function, the controller 1 may display the expiration date in the field 605.

Figure 7:
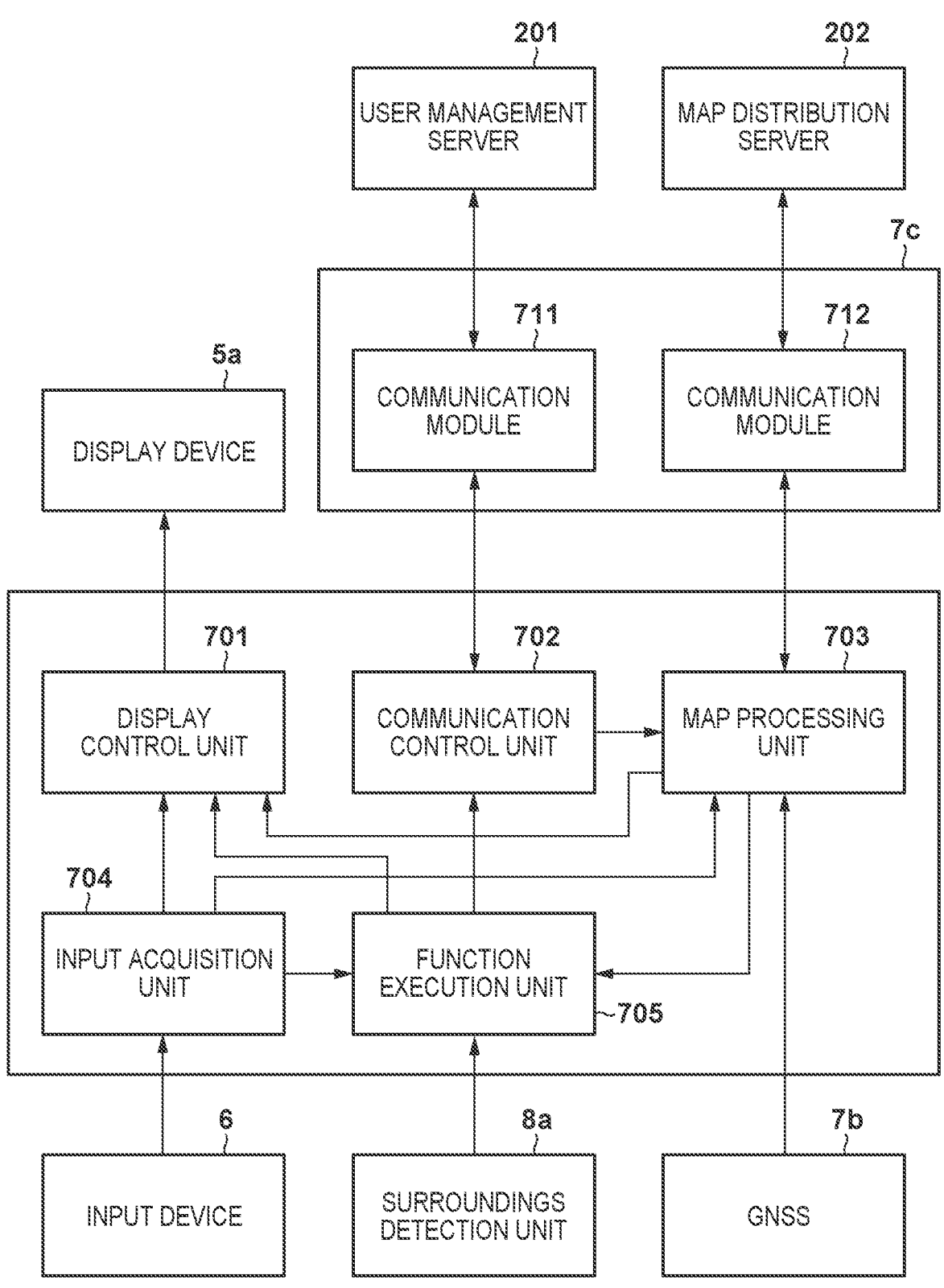
FIG. 7 is a block diagram illustrating a functional configuration example of a controller of a vehicle according to some embodiments.

A functional configuration example of the controller 1 for communicating with the user management server 201 and the map distribution server 202 will be specifically described with reference to FIG. 7. The controller 1 may include a display control unit 701, a communication control unit 702, a map processing unit 703, an input acquisition unit 704, and a function execution unit 705. The controller 1 may not include some of the functional units illustrated in FIG. 7 or may include functional units not illustrated in FIG. 7. Each of the functional units (the display control unit 701, the communication control unit 702, the map processing unit 703, the input acquisition unit 704, and the function execution unit 705) illustrated in FIG. 7 may be realized by a separate ECU. Alternatively, two or more functional units illustrated in FIG. 7 may be integrated into one ECU, or one functional unit may be realized by a plurality of ECUs.

The communication device 7 *c* may include two separate communication modules 711 and 712. Both the communication modules 711 and 712 may support cellular communication. For example, both the communication modules 711 and 712 may include an antenna and a signal processing circuit. The communication module 711 may be used for communication with the user management server 201. The communication module 712 may be used for communication with the map distribution server 202. As described above, the communication with the user management server 201 and the communication with the map distribution server 202 are performed by using separate communication modules, so that communication setting and the communication contract corresponding to characteristics of data to be communicated can be executed. For example, the map information received from the map distribution server 202 can be a large amount of data. Therefore, a flat-rate plan may be suitable for communication by the communication module 711. On the other hand, a metered-rate plan can be suitable for communication with the user management server 201 having a relatively small data amount.

The display control unit 701 may control display on the display device 5a. The display device 5a may include the meter display section 401, the indicator 405, a display for displaying the screen 600, and the like as described above.

The display control unit 701 may perform notification in S307 of FIG. 3, display of the screen 600, and the like.

The communication control unit 702 communicates with the user management server 201 by using the communication module 711. As described above with reference to FIG. 2, the communication control unit 702 may transmit the identification information of the vehicle V, the account information of the user, and the information indicating the state of the vehicle V to the user management server 201 by using the communication module 711. The communication control unit 702 may use the communication module 711 to receive information indicating whether the user has the authority to use a specific vehicle control function from the user management server 201, and if set, an expiration date of the authority to use the vehicle control function.

The map processing unit 703 performs processing related to high-precision map information. As described above with reference to FIG. 2, the map processing unit 703 may transmit information indicating that the user has authorization to use information (for example, high-precision map information) used in a specific vehicle control function to the map distribution server 202 by using the communication module 712. The map processing unit 703 may receive information (for example, high-precision map information) used in the specific vehicle control function from the map distribution server 202 by using the communication module 712. The map processing unit 703 may make a request for the map distribution server 202 to transmit map information of a range corresponding to the current geographical position of the vehicle V which is measured by the GNSS sensor 7*b* that is an example of a positioning sensor.

The map processing unit 703 may determine whether the user has authority to use a specific vehicle control function (S302 in FIG. 3). The map processing unit 703 may determine whether the expiration date of the authority to use a specific vehicle control function has passed by using the time acquired by the GNSS sensor 7*b*. The GNSS sensor 7*b* can acquire an accurate time from an artificial satellite used for positioning. When determining whether the expiration date has passed by using the time, this determination can be executed with high accuracy. For example, the map processing unit 703 may acquire the expiration date received from the user management server 201 from the communication control unit 702. The map processing unit 703 may notify the function execution unit 705 of a determination result as to whether the expiration date of the authority to use the specific vehicle control function has passed.

The input acquisition unit 704 may detect a user's operation on the input device 6. The input device 6 may include the physical button 406 as described above, a touch panel for detecting contact with the screen 600, and the like. The input acquisition unit 704 may detect the operation in S301 of FIG. 3, the operation on the screen 600, and the like.

The function execution unit 705 may execute a vehicle control function. The function execution unit 705 may execute a specific vehicle control function based at least in part on that the user has authority to use the function. The function execution unit 705 may execute the vehicle control function based on the situation around the vehicle V acquired from the surroundings detection unit 8*a* or the like. The function execution unit 705 may execute operations in S303 to S306 of FIG. 3.

SUMMARY OF EMBODIMENTS

<Item 1> A control device (1) for a vehicle (V), the control device comprising:

a vehicle control unit (705) configured to execute a particular vehicle control function based at least in part on that a user of the vehicle has authority to use the vehicle control function;

a first acquisition unit (704) configured to acquire a first instruction related to the vehicle control function from the user by using a first operation unit (601-604) temporarily presented to the user;

a second acquisition unit (704) configured to acquire a second instruction related to the vehicle control function from the user by using a second operation unit (406) permanently presented to the user;

a display control unit (701) configured to display the first operation unit in appearance indicating that the first instruction cannot be given in a case where the user does not have the authority to use the vehicle control function; and a notification control unit (710) configured to notify the user of the fact that the second instruction cannot be given in response to operation of the second operation unit in a case where the user does not have the authority to use the vehicle control function.

According to this item, it is easy to know what the situation of the authority to use the vehicle control function is.

<Item 2> The control device according to Item 1, wherein the second operation unit is a button (406) that physically exists.

According to this item, the occupant can give an instruction by operating a physical button.

<Item 3> The control device according to Item 1, wherein the second operation unit is a button (406) provided on a steering wheel (ST) of the vehicle.

According to this item, the occupant can give an instruction while holding the steering wheel.

<Item 4> The control device according to Item 3, wherein the second instruction is an instruction for execution of the vehicle control function.

According to this item, the occupant can give an instruction for execution of the vehicle control function while holding the steering wheel.

<Item 5> The control device according to Item 4, further comprising a second notification control unit (701) configured to notify the user of the fact that the vehicle control function is executable by using a notification unit provided in the steering wheel, wherein the vehicle control unit executes the vehicle control function based at least in part on that the second operation unit is operated in a state in which the vehicle control function is executable.

According to this item, the user can execute the vehicle control function while knowing that the vehicle control function is executable.

<Item 6> The control device according to Item 5, wherein the vehicle control function is a drive assist function that automatically changes a lane of the vehicle.

According to this item, the user can use the lane change function.

<Item 7> The control device according to Item 1, further comprising an inquiry unit (702) configured to inquire of a server whether the user has the authority to use the vehicle control function.

According to this item, whether the user has the use authority can be centrally managed by the server.

<Item 8> The control device according to Item 7, wherein the inquiry unit acquires an expiration date of the authority to use the vehicle control function from the server.

According to this item, the use authority can be canceled in a case where the use authority is exceeded.

<Item 9> The control device according to Item 8, wherein the server assigns the authority to use the vehicle control function to the user in response to a request from the user.

According to this item, the user can acquire the use authority on his/her own will.

<Item 10> The control device according to Item 1, wherein in a case where the user has the authority to use the vehicle control function and the user does not agree with use of personal information by the control device, the notification control unit notifies the user of the fact that agreement regarding use of the personal information is necessary for execution of the vehicle control function in response to operation of the second operation unit.

According to this item, it is easy for the user to know that agreement regarding use of personal information is necessary.

<Item 11> A program causing a computer to function as the control device of any one of Items 1-10.

According to this item, a program capable of realizing the control device of the above-described item is provided.

<Item 12> A method for controlling a vehicle (V), the method comprising:

executing (S306) a particular vehicle control function based at least in part on that a user of the vehicle has authority to use the vehicle control function;

acquiring (600) a first instruction related to the vehicle control function from the user by using a first operation unit (601-604) temporarily presented to the user;

acquiring (S301) a second instruction related to the vehicle control function from the user by using a second operation unit (406) permanently presented to the user;

displaying (600) the first operation unit in appearance indicating that the first instruction cannot be given in a case where the user does not have the authority to use the vehicle control function; and notifying (S307) the user of the fact that the second instruction cannot be given in response to operation of the second operation unit in a case where the user does not have the authority to use the vehicle control function.

According to this item, it is easy to know what the situation of the authority to use the vehicle control function is.

The invention is not limited to the foregoing embodiments, and various variations/changes are possible within the spirit of the invention.

What is claimed is:

1. A control device for a vehicle, the control device comprising:

a vehicle control unit configured to execute a particular vehicle control function based at least in part on that a user of the vehicle has authority to use the vehicle control function;

a first acquisition unit configured to acquire a first instruction related to the vehicle control function from the user by using a first operation unit temporarily presented to the user;

a second acquisition unit configured to acquire a second instruction related to the vehicle control function from the user by using a second operation unit permanently presented to the user;

a display control unit configured to display the first operation unit in appearance indicating that the first instruction cannot be given in a case where the user does not have the authority to use the vehicle control function; and a notification control unit configured to notify the user of the fact that the second instruction cannot be given in response to operation of the second operation unit in a case where the user does not have the authority to use the vehicle control function.

2. The control device according to claim 1, wherein the second operation unit is a button that physically exists.

3. The control device according to claim 1, wherein the second operation unit is a button provided on a steering wheel of the vehicle.

4. The control device according to claim 3, wherein the second instruction is an instruction for execution of the vehicle control function.

5. The control device according to claim 4, further comprising a second notification control unit configured to notify the user of the fact that the vehicle control function is executable by using a notification unit provided in the steering wheel, wherein the vehicle control unit executes the vehicle control function based at least in part on that the second operation unit is operated in a state in which the vehicle control function is executable.

6. The control device according to claim 5, wherein the vehicle control function is a drive assist function that automatically changes a lane of the vehicle.

7. The control device according to claim 1, further comprising an inquiry unit configured to inquire of a server whether the user has the authority to use the vehicle control function.

8. The control device according to claim 7, wherein the inquiry unit acquires an expiration date of the authority to use the vehicle control function from the server.

9. The control device according to claim 8, wherein the server assigns the authority to use the vehicle control function to the user in response to a request from the user.

10. The control device according to claim 1, wherein in a case where the user has the authority to use the vehicle control function and the user does not agree with use of personal information by the control device, the notification control unit notifies the user of the fact that agreement regarding use of the personal information is necessary for execution of the vehicle control function in response to operation of the second operation unit.

11. A non-transitory storage medium that stores a program causing a computer to function as the control device of claim 1.

12. A method for controlling a vehicle, the method comprising:

executing a particular vehicle control function based at least in part on that a user of the vehicle has authority to use the vehicle control function;

acquiring a first instruction related to the vehicle control function from the user by using a first operation unit temporarily presented to the user;

acquiring a second instruction related to the vehicle control function from the user by using a second operation unit permanently presented to the user;

displaying the first operation unit in appearance indicating that the first instruction cannot be given in a case where the user does not have the authority to use the vehicle control function; and notifying the user of the fact that the second instruction cannot be given in response to operation of the second operation unit in a case where the user does not have the authority to use the vehicle control function.

* * * * *